Sept. 18, 1951 E. B. LEWIS 2,567,949
APPARATUS FOR MAKING SPONGE RUBBER
Filed Feb. 21, 1948 3 Sheets-Sheet 1
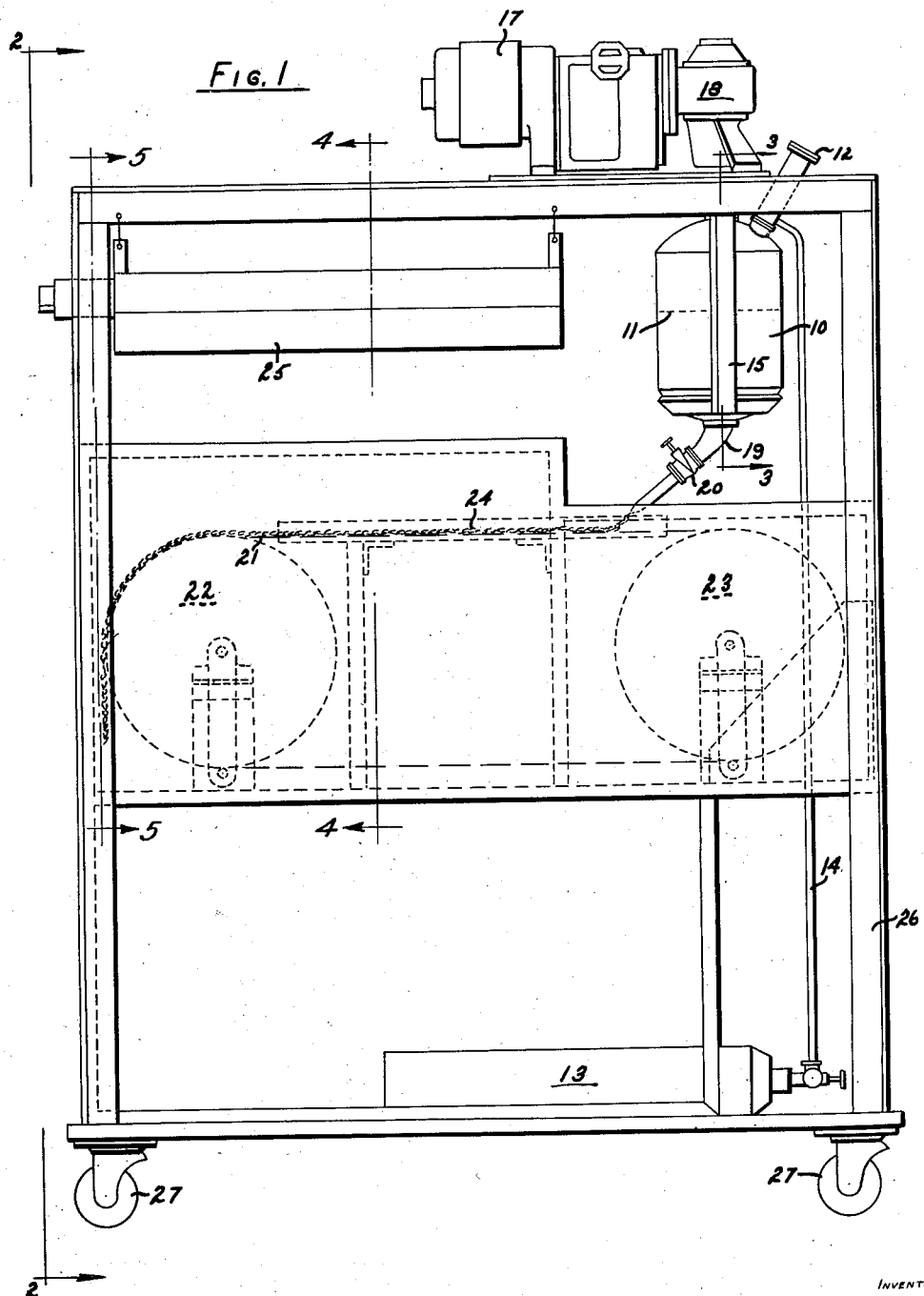
INVENTOR
ELISHA B. LEWIS
BY
Toulmin & Toulmin
Attorneys

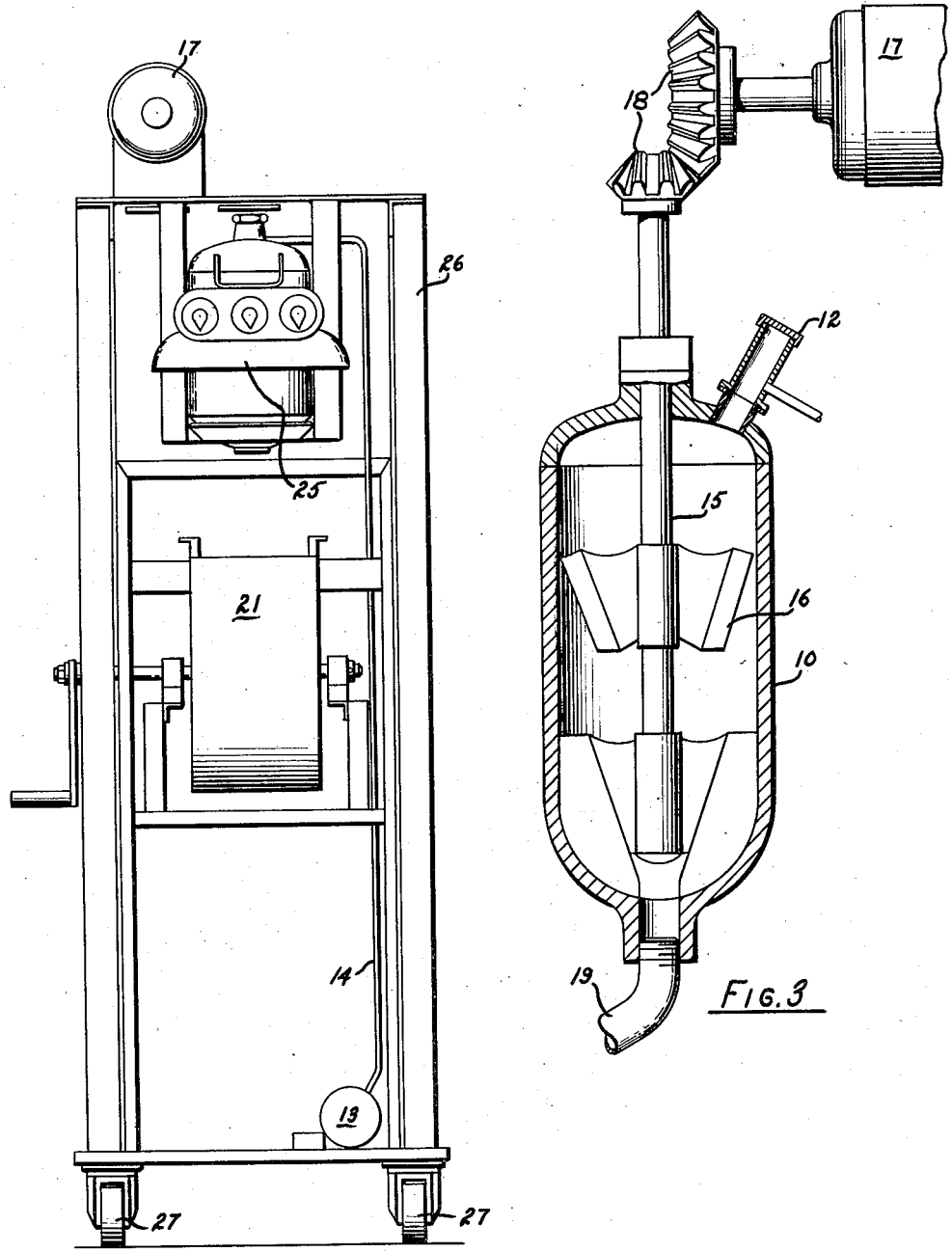

Sept. 18, 1951  E. B. LEWIS  2,567,949
APPARATUS FOR MAKING SPONGE RUBBER
Filed Feb. 21, 1948  3 Sheets-Sheet 3
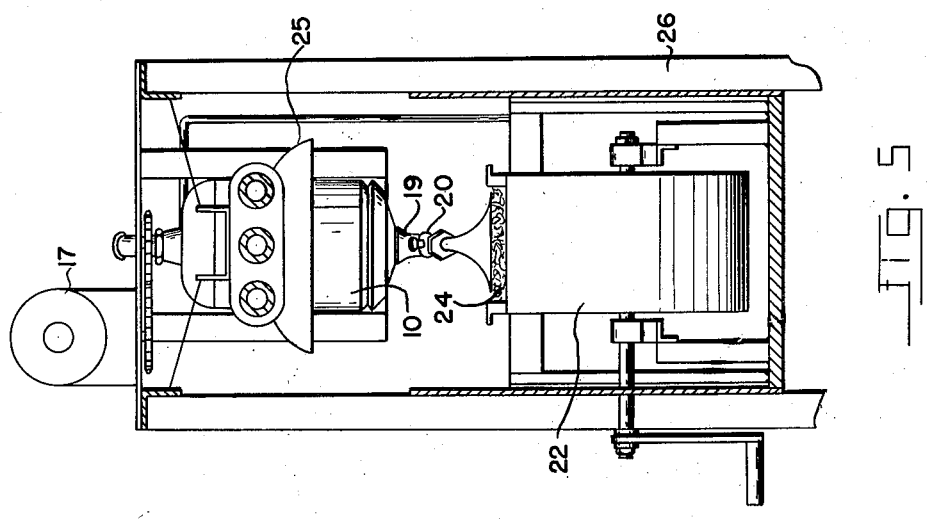
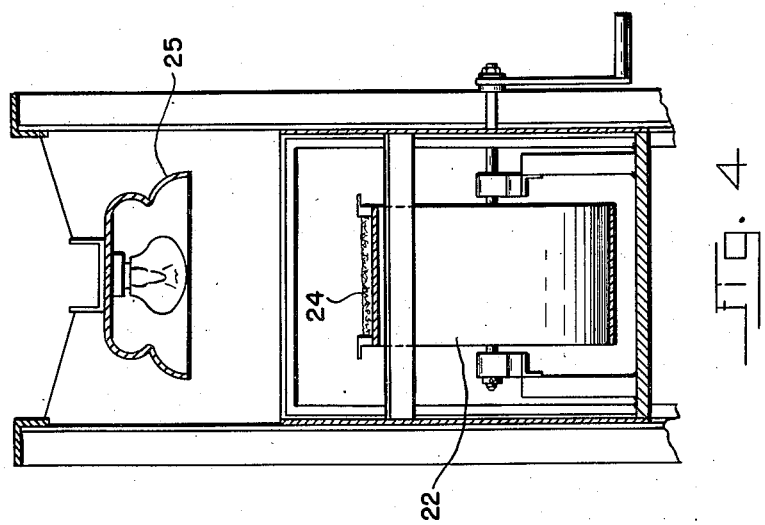
INVENTOR
ELISHA B. LEWIS
BY
Toulmin & Toulmin
ATTORNEYS

Patented Sept. 18, 1951

2,567,949

UNITED STATES PATENT OFFICE 2,567,949

APPARATUS FOR MAKING SPONGE RUBBER

Elisha B. Lewis, Dayton, Ohio, assignor to The Commonwealth Engineering Company of Ohio, Dayton, Ohio, a corporation of Ohio Application February 21, 1948, Serial No. 10,137

3 Claims. (Cl. 18—15)

This invention deals with an apparatus for manufacturing sponge rubber.

It is an object of this invention to provide an apparatus with which sponge rubber may be manufactured in a continuous process.

It is another object of this invention to provide an apparatus for the manufacture of sponge rubber which is easy to handle and does not require skilled labor.

It is another object of this invention to provide an apparatus for the manufacture of sponge rubber which is simple and inexpensive.

It is still another object of this invention to provide an apparatus for the manufacture of sponge rubber with which a product of a highly porous and uniform structure is obtained.

It is still another object of this invention to provide an apparatus for the manufacture of sponge rubber which has discrete cells.

The invention will be more clearly understood from the following description taken in connection with the accompanying drawings, in which Figure 1 is a front elevational view of the apparatus of my invention;

Figure 2 is a side elevational view of the apparatus shown in Figure 1; and

Figure 3 is a fragmentary cross-sectional view on an enlarged scale.

Figure 4 is a section on Figure 1 on the line 4—4 looking in the direction of the arrows;

Figure 5 is a section on the line 5—5 looking in the direction of the arrows, on Figure 1.

Referring to the drawings in particular, the reference numeral 10 indicates a container which holds latex 11 to be converted into sponge rubber. A fill cap 12 is arranged at the top of said container 10 through which latex may be continuously supplied as it is consumed in the process. A steel cylinder or other gas storage tank 13 is connected with said inlet 12 by means of a pipe 14. In the container 10, there is axially arranged a rotatable shaft 15 on which a vane 16 is mounted (Figure 3). This combination of shaft and vane represents the stirring device. A motor 17 drives said stirring device by means of a speed changer consisting of a gear 18. The container 10 furthermore has an outlet pipe 19 at its bottom with a gate valve 20 mounted therein. Said outlet pipe 19 terminates above an endless belt 21 which runs over two rotating rolls 22 and 23. The reference numeral 24 designates a layer of rubber foam as it leaves the container 10 through the pipe 19. At the opposite end of the apparatus, above the belt holding the sponge layer 24, a set of infra-red lamps 25 is arranged for the purpose of curing the foam layer formed so as to produce the sponge rubber material.

The entire assembly is mounted in a frame 26. In the case illustrated, it is a movable laboratory unit; a plurality of casters 27 is arranged at the bottom of the frame in order to facilitate moving of the apparatus.

The apparatus of my invention operates as follows: Latex is foamed in the container 10 by means of a gas derived from the tank 13. This gas is preferably nitrous oxide. The foam, as it is formed, is dispensed from the container and continuously deposited on the moving belt 21. the thickness of the layer depending upon the speed of said belt. The foam layer 24 thus obtained travels with the belt and gradually arrives under the lamps 25 where it is cured by the heat irradiated therefrom.

All latices may be used in the apparatus of my invention; however, neoprene has been found to be particularly suitable. A concentration of approximately 50 per cent has been found advantageous for the latex although other concentrations give equally satisfactory results.

The latex advantageously contains approximately 2.5 parts by volume of a sodium silicate solution per 100 parts by volume of latex. The sodium silicate which has proved to be particularly well operative has a density of 41° Bé. and a ratio of alkali to silica of 1:3.22. The sodium silicate acts as a foam stabilizer and as a curing decelerator; by its use, refrigeration of the latex, usually necessary to avoid premature coagulation, may be dispensed with. Another very essential advantage which is due to the addition of sodium silicate, is that the sponge product obtained has the most desirable property of being non-inflammable.

The quantity of sodium silicate, namely approximately 2.5 parts by volume per 100 parts by volume of rubber, is critical; if too much sodium silicate is used, the foam becomes grainy, decomposes and decolorizes under the curing conditions. The process preferably carried out in the apparatus of my invention forms the subject matter of my co-pending application Serial No. 13,605 filed March 8, 1948, now abandoned and is described there in detail.

Although the apparatus provides for speed control so that lower or higher speeds may be used according to the preference of the manufacturer, it has been found advantageous to use a speed of from 4,000 to 5,000 R. P. M. for stirring.

While in the drawing a vane stirrer is shown, the apparatus may be modified and a compound blade stirrer be used instead.

In one preferred embodiment of the invention, infra-red lamps of 375 watts and an electric current of 115 volts were used. In this instance, the lamps had a distance of approximately 16" from the surface of the rubber foam. A curing time of from 15 to 20 minutes was satisfactory in that instance.

Another very satisfactory arrangement of the infra-red curing equipment is that of connecting those infra-red lamps which supply the heat for initial curing with a source of a current of 110 volts and supplying the remaining lamps with a current of 220 volts.

The apparatus may also be modified so as to have infra-red lamps for the initial curing step only and a conventional oven for final curing. All these modifications are within the scope of my invention.

In case that a relatively thick product is to be manufactured, it was found advisable to prepare and cure such a product in installments. To this end, the apparatus is modified by arranging a plurality of sets in a series above the endless belt, each of such sets consisting of a latex container with a gas supply and a foam outlet as described and of a curing device. Such a product formed in steps represents an integral unit which is entirely free from any lines of separation.

If it is desired, a compressor may be arranged in the pipe line 14 in order to introduce the nitrous oxide gas under pressure; however, there are no essential advantages connected with the application of pressure with the exception of that of a slightly higher volume increase. However, when pressure is used, an autoclave must be used instead of the container 10.

It will be understood that while there have been described in this specification certain embodiments of my invention, it is not intended thereby to have the invention limited to the specific details given in view of the fact that my invention is susceptible to various modifications and changes which come within the spirit of the disclosure and the scope of the appended claims.

I claim:

1. An apparatus for making sponge rubber, comprising in combination, a container for receiving latex, primary conduit means for conveying latex into said container, secondary conduit means connected to said first conduit means for conveying into said latex in said primary conduit means a gas under pressure, a stirring device provided in said container and operable to convert said latex into rubber foam, conveyer means adapted to receive rubber foam formed in said container, and a bank of infra red lights above said conveyer means, said conveyer means being arranged to pass said rubber foam below said lamps to bring about curing of said rubber foam, a portable framework and means for mounting all of the aforementioned elements of the apparatus on said portable framework.

2. In an apparatus for making sponge rubber, a container for receiving latex; a primary conduit means for conveying latex into said container; a tank for inert gas and secondary conduit means leading from said tank into said first conduit means; a stirring device arranged in said container and operable to convert said latex into rubber foam; receiving means for the rubber foam formed in said container; means for dispensing said foam from said container and depositing it on said receiving means; and means for curing said foam, said means consisting of a plurality of infra-red lamps for initial curing and an oven for final curing of said foam.

3. In an apparatus for making sponge rubber, a container for receiving latex; a primary conduit for conveying latex into said container; a tank, and secondary conduit means leading from said tank into said primary conduit; a stirring device provided in said container and operable to convert said latex into rubber foam; receiving means for the rubber foam; means for dispensing said foam from said container and depositing it on said receiving means; and means comprising a bank of infra-red lights located immediately above said receiving means for curing said foam.

ELISHA B. LEWIS.

REFERENCES CITED

The following references are of record in the file of this patent:

UNITED STATES PATENTS

| Number | Name | Date |
|---|---|---|
| 666,703 | Seilacher | Jan. 29, 1901 |
| 1,467,867 | Mauch | Sept. 11, 1923 |
| 2,283,316 | Cooper et al. | May 19, 1942 |
| 2,342,920 | Clark | Feb. 29, 1944 |
| 2,388,042 | Daily | Oct. 30, 1945 |
| 2,439,083 | French | Apr. 6, 1948 |
| 2,441,235 | Blair et al. | May 11, 1948 |